United States Patent [19]
Kim

[11] Patent Number: 5,986,862
[45] Date of Patent: Nov. 16, 1999

[54] ELECTROSTATIC DISCHARGE PROTECTION CIRCUIT

[75] Inventor: Yong-Hwan Kim, Kyangsangbuk-do, Rep. of Korea

[73] Assignee: LG Semicon Co., Ltd., Cheongju, Rep. of Korea

[21] Appl. No.: 08/929,094

[22] Filed: Sep. 15, 1997

[30] Foreign Application Priority Data

Dec. 31, 1996 [KR] Rep. of Korea ............... 9679243

[51] Int. Cl.[6] ............................................. H02H 9/00
[52] U.S. Cl. ................................... 361/56; 361/104
[58] Field of Search ............................. 361/56, 57, 58, 361/91, 104, 111, 119, 126, 127; 257/355, 367, 544, 546, 551, 665

[56] References Cited

U.S. PATENT DOCUMENTS

| | | | |
|---|---|---|---|
| 4,875,130 | 10/1989 | Huard | 361/56 |
| 4,958,200 | 9/1990 | Sekiguchi | 257/32 |
| 5,144,519 | 9/1992 | Chang | 361/58 |
| 5,400,202 | 3/1995 | Metz et al. | 361/56 |
| 5,615,074 | 3/1997 | Avery | 361/56 |
| 5,627,711 | 5/1997 | Pezzani | 361/56 |
| 5,859,758 | 1/1999 | Kim | 361/111 |

*Primary Examiner*—Ronald W. Leja
*Attorney, Agent, or Firm*—Fleshner & Kim

[57] ABSTRACT

An electrostatic discharge protection circuit includes a first and second metals respectively between input and output stages and a power source voltage that open when a strong positive electrostatic discharge is respectively received at the input and output stages. The electrostatic discharge protection circuit further includes first and second diodes having respective anodes coupled to the first and second metals and respective cathodes coupled to the power source voltage stage and first and second protection diodes respectively coupled in parallel with the first and second diodes. Third and fourth metals are respectively between the input and output stages and a ground voltage that open when a strong negative electrostatic discharge is respectively received at the input and output stages. Third and fourth diodes having respective cathodes are coupled to the third and fourth metals and respective anodes coupled to the ground voltage and third and fourth protection diodes respectively coupled in parallel with the third and fourth diodes.

16 Claims, 2 Drawing Sheets

ELECTROSTATIC DISCHARGE PROTECTION CIRCUIT

BACKGROUND OF THE INVENTION

1. Field of the Invention

The present invention relates to a protection circuit, and more particularly, to an electrostatic discharge protection circuit.

2. Background of the Related Art

Generally, an electrostatic discharge protection circuit protects an internal circuit against electrostatic discharge, breakdown voltage, and surge voltage. A related art electrostatic discharge protection circuit will be described with reference to FIG. 1, which is a circuit diagram of the related art electrostatic discharge protection circuit.

Referring to FIG. 1, the related art electrostatic discharge protection circuit includes an internal circuit 11, first and second PN junction diodes 12 and 13 disposed at an input stage of the internal circuit 11, and third and fourth PN junction diodes 14 and 15 disposed at an output stage of the internal circuit 11. An anode of the first PN junction diode 12 is connected to the input stage of the internal circuit 11 and a cathode thereof is connected to a power source voltage stage. An anode of the second PN junction diode 13 is connected to the input stage of the internal circuit 11 and a cathode thereof is connected to a power source voltage stage. An anode of the third PN junction diode 14 is connected to the ground stage and a cathode thereof is connected to an output stage of the internal circuit 11. An anode of the fourth PN junction diode 15 is connected to the output stage of the internal circuit 11 and a cathode thereof is connected to the power source voltage stage.

The first and second PN junction diodes 12 and 13 are protection diodes that protect the internal circuit 11 against the electrostatic discharge applied to the input stage of the internal circuit 11. The third and fourth PN junction diodes 14 and 15 are protection diodes that protect the internal circuit 11 against the electrostatic discharge applied to the output stage of the internal circuit 11.

The operation of the related art electrostatic discharge protection circuit will now be described. As illustrated in FIG. 1, if a negative (−) electrostatic discharge is applied to the input stage of the internal circuit 11, the first PN junction diode 12 is turned on. As a result, the negative electrostatic discharge is bypassed to the ground stage through the first PN junction diode 12. If a positive (+) electrostatic discharge is applied to the input stage of the internal circuit 11, the second PN junction diode 13 is turned on. As a result, the positive electrostatic discharge is bypassed to the power source voltage stage through the second PN junction diode 13.

Meanwhile, if the negative (−) electrostatic discharge is applied to the output stage of the internal circuit 11, the third PN junction diode 14 is turned on. As a result, the negative electrostatic discharge is bypassed to the ground stage through the third PN junction diode 14. If the positive (+) electrostatic discharge is applied to the output stage of the internal circuit 11, the fourth PN junction diode 15 is turned on. As a result, the positive electrostatic discharge is bypassed to the power source voltage stage through the fourth PN junction diode 15.

Thus, the related art electrostatic discharge protection circuit has two PN junction diodes respectively at the input and output stages of the internal circuit 11 to protect the internal circuit 11 against the negative or the positive electrostatic discharge.

However, the related art electrostatic discharge protection circuit has various disadvantages. Since a discharge path that protects the internal circuit depends on a junction area of the PN junction diode and its density, the junction area of the PN junction diode must be greater in the case that a strong electrostatic discharge is applied. In addition, if junction breakdown of the PN junction diode occurs because of a strong electrostatic discharge, it is difficult to realize the discharge path. As a result, it is not possible to protect the internal circuit.

SUMMARY OF THE INVENTION

An object of the present invention is to provide an electrostatic discharge protection circuit that substantially obviates one or more of the problems caused by limitations and disadvantages of the related art.

Another object of the present invention is to provide an electrostatic discharge protection circuit suitable for safety protection of an internal circuit against the electrostatic discharge using a protection circuit.

A further object of the present invention is to prevent junction breakdown of a PN junction diode caused by a strong electrostatic discharge.

To achieve these and other advantages in whole or in part and in accordance with the purpose of the present invention, as embodied and broadly described, an electrostatic discharge protection circuit according to the present invention includes a first metal between an input stage and a power source voltage stage, for automatically being opened through the input stage in the event of applying a strong positive electrostatic discharge; a second metal between an output stage and the power source voltage stage, for automatically being opened through the output stage in the event of applying a strong positive electrostatic discharge; first and second diodes having respective anodes coupled to the first and second metals and respective cathodes coupled to the power source voltage stage; first and second protection diodes respectively coupled in parallel to the first and second diodes; a third metal between the input stage and a ground stage, for automatically being opened through the input stage in the event of applying a strong negative electrostatic discharge; a fourth metal between the output stage and the ground stage, for automatically being opened through the output stage in the event of applying a strong negative electrostatic discharge; third and fourth diodes having respective cathodes coupled to the third and fourth metals and respective anodes coupled to the ground stage, and third and fourth protection diodes respectively coupled in parallel to the third and fourth diodes.

To further achieve these and other advantages in whole or in part, an electrostatic discharge protection circuit according to the present invention includes first and second two-stage discharge protection circuits respectively between input and output terminals and a first reference voltage potential, and second and third two-stage protection circuits respectively between the input and output terminals and a second reference voltage.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
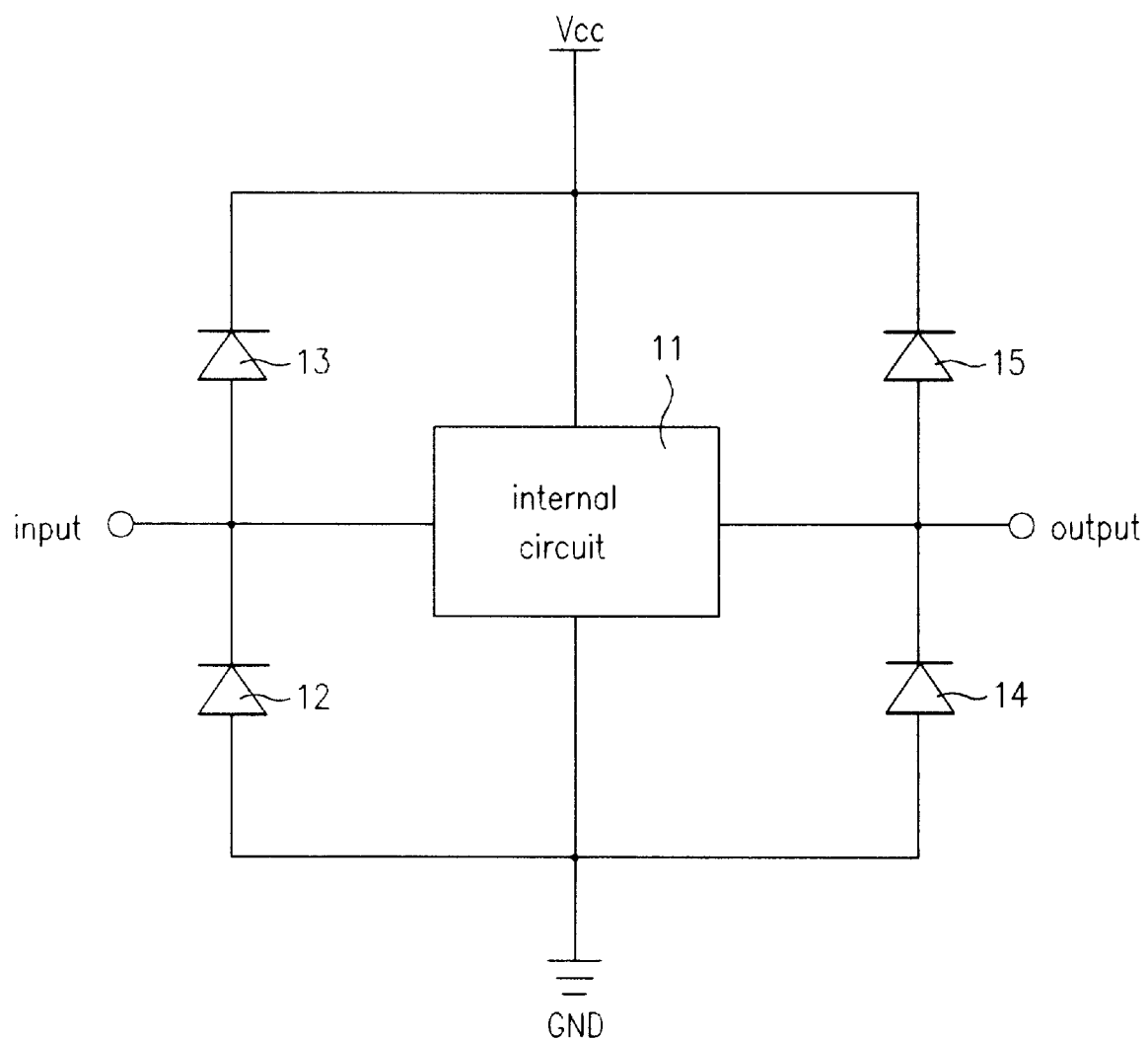
FIG. 1 is a circuit diagram showing a related art electrostatic discharge protection circuit.
Figure 2:
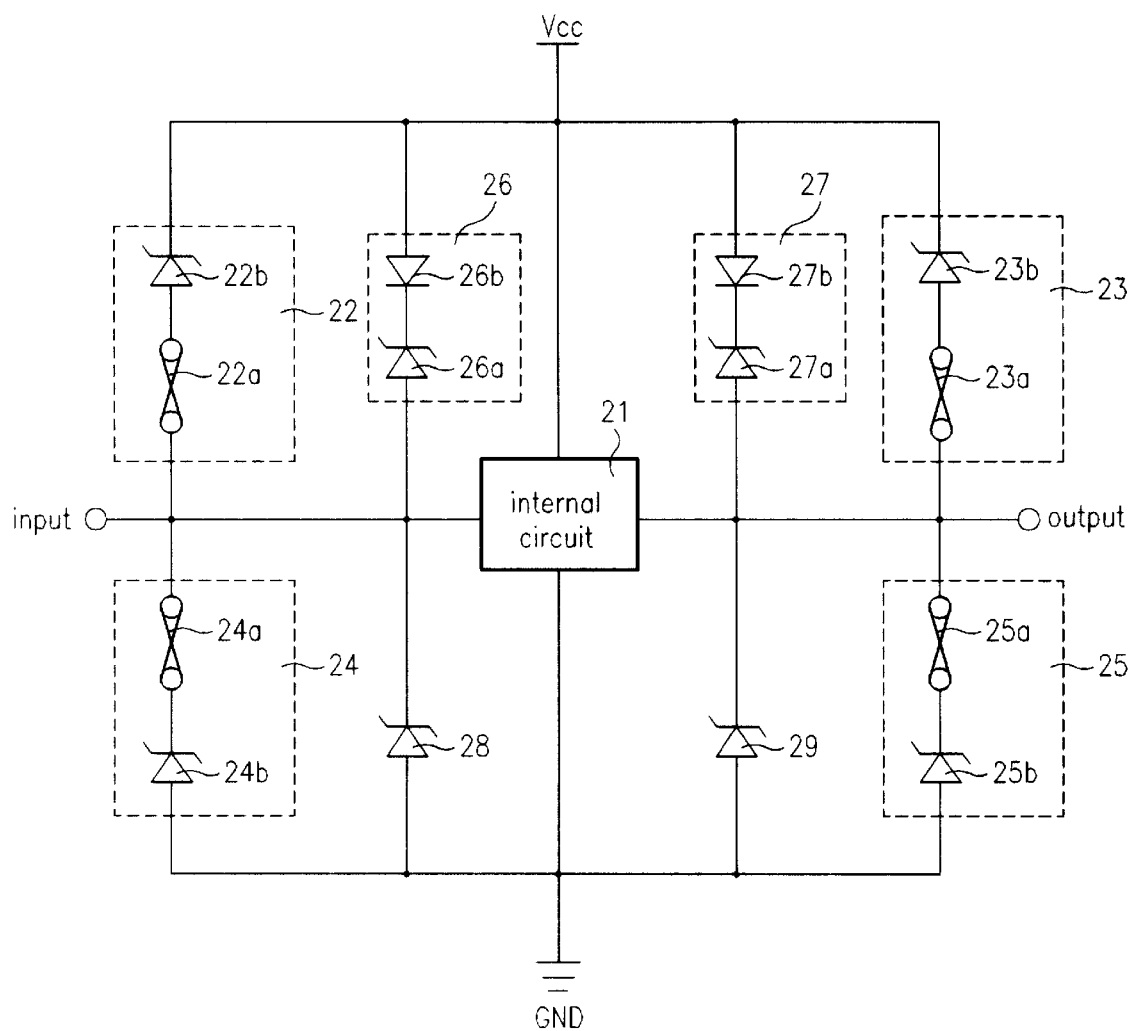
FIG. 2 is a circuit diagram showing a preferred embodiment of an electrostatic discharge protection circuit according to the present invention.

As illustrated in FIG. 2, a preferred embodiment of an electrostatic discharge protection circuit of the present invention includes an internal circuit 21, a first bypass portion 22 formed between an input stage and a power source voltage stage, a second bypass portion 23 formed between an output stage and the power source voltage stage, a third bypass portion 24 formed between the input stage and a ground stage and a fourth bypass portion 25 formed between the output stage and the ground stage. The preferred embodiment of the electrostatic discharge protection device further includes first and second protection portions 26 and 27 respectively coupled in parallel to the first and second bypass portions 22 and 23, and third and fourth protection portions 28 and 29 respectively coupled in parallel to the third and fourth bypass portions 24 and 25.

The first bypass portion 22 includes a first metal 22a and a first diode 22b. The first metal 22a is disposed between the input stage and the power source voltage stage. The first diode 22b has an anode coupled to the first metal 22a and a cathode coupled to the power source voltage stage.

The second bypass portion 23 includes a second metal 23a and a second diode 23b.

The second metal 23a is disposed between the output stage and the power source voltage stage. The second diode 23b has an anode coupled to the second metal 23a and a cathode coupled to the power source voltage stage.

The third bypass portion 24 includes a third metal 24a and a third diode 24b. The third metal 24a is disposed between the input stage and the ground stage. The third diode 24b has an cathode coupled to the third metal 24a and a anode coupled to the ground stage.

The fourth bypass portion 25 includes a fourth metal 25a and a fourth diode 25b. The fourth metal 25a is disposed between the output stage and the ground stage. The fourth diode 25b has an anode coupled to the ground stage and a cathode coupled to the fourth metal 25a.

The first protection portion 26 is coupled in parallel to the first bypass portion 22 and includes a fifth diode 26a and a sixth diode 26b. The fifth diode 26a has an anode coupled to the input stage and a cathode coupled to a cathode of the sixth diode 26b.

An anode of the sixth diode 26b is connected to the power source voltage stage.

The second protection portion 27 is coupled in parallel to the second bypass portion 23 and includes a seventh diode 27a and an eighth diode 27b. The seventh diode 27a has an anode coupled to the output stage and a cathode coupled to a cathode of the eighth diode 27b. An anode of the eighth diode 27b is coupled to the power source voltage stage.

The third protection portion 28 is coupled in parallel to the third bypass portion 24 and includes a ninth diode having a cathode is coupled to the input stage and an anode is coupled to the ground stage. The fourth protection portion 29 is coupled in parallel to the fourth bypass portion 25 and includes a tenth diode having a cathode is coupled to the output stage and an anode is coupled to the ground stage.

The sixth diode 26b and the eighth diode 27b are preferably examples of a PN junction diode. The remaining diodes are preferably examples of a Schottky diode. Operations of the preferred embodiment electrostatic discharge protection circuit of the present invention will now be described.

First, if a negative (−) electrostatic discharge is applied to the input and output stages, the Schottky diodes, i.e., the third, fourth, ninth, and tenth diodes 24b, 25b, 28 and 29 are turned on. At this time, the third metal 24a and the fourth metal 25a are also in turn-on state. As a result, the electrostatic discharge is bypassed to the ground stage through the third, fourth, ninth, and tenth diodes 24b, 25b, 28 and 29.

If a strong negative electrostatic discharge is applied, the third and fourth metals 24a and 25a are opened so as not to generate junction breakdown of the Schottky diodes, i.e., the third, fourth, ninth and tenth diodes 24b, 25b, 28 and 29. In other words, junction breakdown of the Schottky diodes is prevented by opening the third and fourth metals 24a and 25a even if the strong electrostatic discharge is applied.

The junction breakdown of Schottky diodes means that the Schottky diodes are shorted. Thus, if the junction breakdown occurs, input and output signals are bypassed to the ground stage through the shorted Schottky diodes. However, in the preferred embodiment of the present invention, since the junction breakdown of the Schottky diodes is prevented, bypassing the input and output signals to the ground stage can be prevented.

Further, if the third and fourth metals 24a and 25a are opened, the third and fourth diodes are turned off so that a path is not formed. As a result, since the input and output signals will not be bypassed, normal circuit operations can be achieved. Under such circumstances, if the negative electrostatic discharge is applied, the electrostatic discharge is bypassed to the ground stage through the ninth diode and the tenth diode.

If positive (+) electrostatic discharge is applied to the input and output stages, the Schottky diodes, i.e., the first, second, fifth and seventh diodes 22b, 23b, 26a and 27a are turned on and the PN junction diodes, i.e., the sixth and eighth didoes 26b and 27b have a reverse junction capacitor characteristic. As a result, the electrostatic discharge is discharged to power source voltage stage through either the first and second diodes 22b and 23b or the fifth, sixth, seventh and eighth diodes 26a, 26b, 27a and 27b.

If a strong positive electrostatic discharge is applied, the first and second metals 22a and 23a are opened so as not to generate the junction breakdown of the first, second, fifth, sixth, seventh and eighth diodes 22b, 23b, 26a, 26b, 27a and 27b. Thus, the junction breakdown of the first and second diodes 22b and 23b as well as the fifth, sixth, seventh and eighth diodes 26a, 26b, 27a and 27b can be prevented.

If the first and second diodes 22b and 23b and the fifth, sixth, seventh and eighth diodes 26a, 26b, 27a and 27b are shorted due to the junction breakdown, input and output signals are bypassed to the power source voltage stage through the shorted diodes. The preferred embodiment of the present invention allows the circuit to perform a normal operations by preventing the junction breakdown of such diodes. In other words, if the first and second metals 22a and 23a are opened, the first and second diodes 22a and 23a are turned off so that a path is not formed. As a result, since the input and output signals will not be bypassed, normal circuit operations can be achieved. At this time, if the positive electrostatic discharge is applied, the first and second metals 22a and 23a are opened so that the electrostatic discharge is discharged to the power source voltage stage through a path coupled to the fifth and sixth diodes 26a and 26b as well as the seventh and eighth diodes 27a and 27b.

The respective metals are automatically opened if a voltage such as a fuse having a predetermined voltage or greater is applied. Thus, the junction breakdown of the diodes caused by avalanche breakdown can be prevented.

Accordingly, the electrostatic discharge protection circuit of the present invention has various advantages. If the strong electrostatic discharge is applied, the metal is opened to prevent junction breakdown of the respective diodes. This allows a semiconductor device to perform a normal operation, even if the strong electrostatic discharge occurs.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A circuit comprising:
    an internal circuit connected to input and output stages and first and second reference voltage stages; and
    an electrostatic discharge protection device that comprises:
        a first metal connected to the input stage that selectively disconnects when a positive electrostatic discharge is applied to the input stage;
        a second metal connected to the output stage that selectively disconnects when a positive electrostatic discharge is applied to the output stage;
        first and second diodes having respective anodes coupled to the first and second metals and cathodes coupled to the first reference voltage stage to form first and second bypass devices;
        first and second protection devices respectively coupled in parallel with the first and second bypass devices;
        a third metal connected to the input stage that selectively disconnects when a negative electrostatic discharge is applied to the input stage;
        a fourth metal connected to the output stage that selectively disconnects when a negative electrostatic discharge is applied to the output stage;
        third and fourth diodes having respective cathodes coupled to the third and fourth metals and anodes coupled to the second reference voltage stage to form third and fourth bypass devices; and
        third and fourth protection devices respectively coupled in parallel with the third and fourth bypass devices, wherein the first bypass and protection devices, and the third bypass and protection devices provide at least two independent levels of protection to the internal circuit from positive and negative electrostatic discharge impinging on the input stage.

2. The circuit of claim 1, wherein the first, second, third and fourth metals selectively disconnect in response to a large magnitude electrostatic discharge.

3. The circuit of claim 1, wherein the first protection device includes a fifth diode having an anode coupled to the input stage, and a sixth diode having an anode is coupled to the first reference voltage stage and a cathode coupled to a cathode of the fifth diode.

4. The circuit of claim 3, wherein the fifth diode is a Schottky diode and the sixth diode is a PN junction diode.

5. The circuit of claim 3, wherein the second protection device includes a seventh diode having an anode coupled to the output stage, and an eighth diode having an anode is coupled to the first reference voltage stage and a cathode coupled to a cathode of the seventh diode.

6. The circuit of claim 5, wherein the seventh diode is a Schottky diode and the eighth diode is a PN junction diode.

7. The circuit of claim 5, wherein the third and fourth protection devices are Schottky diodes having respective cathodes coupled to the input stage and the output stage and respective anodes coupled to the second reference voltage stage.

8. The circuit of claim 7, wherein the positive electrostatic discharge respectively applied to the input and output stages is respectively transmitted to the first reference voltage stage through the first and second protection devices if the first and second metals are respectively disconnected.

9. The circuit of claim 1, wherein the first, second, third and fourth metals disconnect at a corresponding prescribed voltage to selectively decouple the first, second, third and fourth bypass devices.

10. The circuit of claim 1, wherein the negative electrostatic discharge respectively applied to the input and output stages is respectively transmitted to the second reference voltage stage through the third and fourth protection devices if the third and fourth metals are respectively disconnected.

11. The circuit of claim 1, wherein the first reference voltage stage is a power source voltage and the second reference voltage stage is a ground voltage.

12. An electrostatic discharge protection device, comprising:
    first and second two-stage discharge protection circuits respectively between input and output stages and a first reference voltage;
    third and fourth two-stage discharge protection circuits respectively between the input and output stages and a second reference voltage, wherein each of the two-stage discharge protection circuits provides at least two separate discharge paths each having different electrostatic discharge response characteristics for at least one of positive and negative electrostatic discharge impinging on the input and output stages, wherein the third and fourth two-stage discharge protection circuits comprise,
    a third metal between the input stage and the second reference voltage that becomes non-conductive when a strong negative electrostatic discharge is applied to the input stage,
    a fourth metal between the output stage and the second reference voltage that becomes non-conductive when a strong negative electrostatic discharge is applied to the output stage,
    third and fourth diodes having respective cathodes coupled to the third and fourth metals and anodes coupled to the second reference voltage, and
    third and fourth protection diodes respectively connected between the input and output stages and the second reference voltage, wherein the third and fourth metals do not conduct a large magnitude electrostatic discharge.

13. The electrostatic discharge protection device of claim 12, wherein each of the first and second two-stage discharge protection circuit comprises:
    a bypass circuit that provides a rapid response to a first electrostatic discharge less than a first prescribed threshold; and
    a protection circuit that alone provides protection from second electrostatic discharge greater than a second prescribed threshold, wherein the second prescribed threshold is greater than the first prescribed threshold.

14. The electrostatic discharge protection device of claim 12, wherein the first and second two-stage discharge protection circuits comprise:

a first metal between the input stage and the first reference voltage that is non-conductive when a strong positive electrostatic discharge is applied to the input stage;

a second metal between the output stage and the first reference voltage that is non-conductive when a strong positive electrostatic discharge is applied to the output stage;

first and second diodes having respective anodes coupled to the first and second metals and cathodes coupled to the first reference voltage; and first protection diodes coupled between the first reference voltage and the input stage, and second protection diodes coupled between the first reference voltage and the output stage.

15. An electrostatic discharge protection device for protecting an internal circuit when one of input and output voltages to the internal circuit exceed a prescribed voltage, comprising:

a first bypass for clamping a first voltage of a first polarity;

a first protection unit for shunting a second voltage of the first polarity, wherein the first voltage is smaller than the second voltage of the first polarity;

a second bypass for clamping a third voltage of a first polarity; and a second protection unit for shunting a fourth voltage of the first polarity, wherein the third voltage is smaller than the fourth voltage, wherein the internal circuit is coupled to an input terminal and an output terminal and a power supply voltage terminal, wherein the first bypass and the first protection unit are coupled in parallel between the input terminal and the power supply voltage terminal, wherein the second bypass and the second protection unit are coupled in parallel between the output terminal and the power supply voltage terminal, and wherein the first and second bypass and protection units comprise, a first metal between the input terminal and the power supply voltage terminal that is non-conductive when a strong first polarity electrostatic discharge is applied to the input terminal, a second metal between the output terminal and the power supply voltage terminal that is non-conductive when a strong first polarity electrostatic discharge is applied to the output terminal, first and second diodes having respective anodes coupled to the first and second metals and cathodes coupled to the power supply voltage terminal, and first protection diodes coupled between the power supply voltage terminal and the input terminal, and second protection diodes coupled between the power supply voltage terminal and the output terminal; and third and fourth bypass and protection units respectively between the input and output terminals and a reference voltage terminal.

16. The electrostatic discharge protection device of claim 15, further comprising:

the third bypass for clamping a first voltage of a second polarity;

the third protection unit for shunting a second voltage of the second polarity;

the fourth bypass for clamping a third voltage of the second polarity; and the fourth protection unit for shunting a fourth voltage of the second polarity, wherein the first voltage of the second polarity is smaller than the second voltage of the second polarity, wherein the third voltage of the second polarity is smaller than the fourth voltage of the second polarity, and wherein the first polarity is an opposite potential to the second polarity.

* * * * *